United States Statutory Invention Registration [19]

[11] Reg. Number: H222

Edwards et al. [43] Published: Mar. 3, 1987

[54] HYDROCARBON CONVERSION CATALYSTS

[75] Inventors: Grant C. Edwards, Silver Spring; William A. Welsh, Fulton; Alan W. Peters, Rockville, all of Md.

[73] Assignee: W. R. Grace & Co., New York, N.Y.

[21] Appl. No.: 842,089

[22] Filed: Mar. 20, 1986

Related U.S. Application Data

[63] Continuation of Ser. No. 659,814, Oct. 11, 1984, abandoned, which is a continuation of Ser. No. 442,117, Nov. 16, 1982, abandoned.

[51] Int. Cl.[4] ..... C10G 11/05
[52] U.S. Cl. ..... 208/120; 502/79
[58] Field of Search ..... 208/120

[56] References Cited

U.S. PATENT DOCUMENTS

| | | | |
|---|---|---|---|
| 3,391,075 | 7/1968 | Plank et al. | 208/120 |
| 3,449,070 | 6/1969 | McDaniel et al. | 502/79 |
| 4,093,560 | 6/1978 | Kerr et al. | 502/79 |
| 4,259,212 | 3/1981 | Gladrow et al. | 502/65 |
| 4,280,895 | 7/1981 | Stuntz et al. | 208/113 |
| 4,480,047 | 10/1984 | Beck et al. | 502/65 |

*Primary Examiner*—John F. Terapane
*Assistant Examiner*—Matthew A. Thexton
*Attorney, Agent, or Firm*—Arthur P. Savage

[57] ABSTRACT

Hydrocarbon conversion catalysts are prepared from synthetic faujasite Type Y zeolites which have an initial (as synthesized) silica to alumina ratio in excess of 5.6 and preferably above 5.8. The catalysts are highly active for the catalytic cracking of hydrocarbons and are particularly resistant to deactivation by high temperature steam in the presence of metals such as nickel and vanadium.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROCARBON CONVERSION CATALYSTS

This application is a continuation of U.S. Ser. No. 659,814, filed Oct. 11, 1984, which is a continuation of U.S. Ser. No. 442,117, filed Nov. 16, 1982, both now abandoned.

The present invention relates to the manufacture of catalysts, and more particularly to zeolite containing hydrocarbon conversion catalysts which are particularly effective for the catalytic cracking of residual hydrocarbon feedstocks that contain substantial quantities of metal contaminants.

Zeolite containing cracking catalysts whch contain synthetic faujasite (Type Y zeolites) have been available to the industry for many years. Type Y zeolites used in the preparation of typical commercially available cracking catalysts possess a silica to alumina ratio of about 4.8 to 5.0. While it is generally known that Type Y zeolites which have high silica to alumina ratios are more stable towards thermal deactivation, commercial quantities of high silica to alumina ratio Type Y zeolites have not been generally available due to the high cost of manufacture.

British Pat. Nos. 1,041,453, 1,044,983 and 1,431,944 disclose the preparation of Type Y zeolites which have a silica to alumina ratio of up to about 7. These references also indicate that the thermal and steam stability of the high silica to alumina ratio zeolites make them particularly suited for the preparation of adsorbents and/or hydrocarbon conversion catalsysts.

U.S. Pat. No. 3,574,538 describes a method for preparing a high silica to alumina ratio Type Y zeolite which may have an initial silica to alumina ratio on the order of 6 that are useful for the preparation of catalysts wherein calcined metakaolin is reacted with sodium silicate under hydrothermal reaction conditions in the presence of zeolitic nucleation centers.

U.S. Pat. No. 3,595,611 and 3,957,623 describe the preparation of catalytically active Type Y zeolite which is obtained by ion exchanging and thermally treating a sodium Type Y zeolite that may possess a silica to alumina ratio of up to about 7.

U.S. Pat. Nos. 3,506,400 and 3,422,795 describe the preparation of hydrocarbon conversion catalysts which contain Type Y zeolite that has been subjected to acid leaching or reaction with chelating agents to obtain thermally stable Type Y zeolites having high silica to alumina ratios.

In recent years the petroleum refining industry has developed a need for reasonably priced catalysts which are capable of converting residual type hydrocarbon feedstocks to valuable products such as gasoline or cycle oil. These residual feedstocks contain high levels of contaminating metals such as nickel and vanadium and in addition contain high levels of sulfur and nitrogen impurities which tend to rapidly deactivate conventional zeolite cracking catalysts. It has been suggested that these residual feedstocks may be pretreated to remove metals and/or nitrogen and sulfur contaminants prior to being subjected to catalytic cracking. However, prior treatment of the residual feedstocks is extremely expensive, both from the standpont of commercial processing and capital investment.

It is therefore an object of the present invention to provide highly active zeolite containing hydrocarbon conversion catalysts.

It is a further object to provide cracking catalysts which remain active in the presence of large quantities of metal contaminants.

It is another object to provide zeolite containing cracking catalysts which are capable of efficiently and economically cracking residual hydrocarbon feedstocks using conventional fluid catalytic cracking (FCC) equipment and processes.

It is still another object of the present invention to provide hydrocarbon conversion catalysts which are extremely resistant to thermal deactivation, particularly during oxidative regeneration at extremely high temperatures in the presence of nickel and vanadium.

These and still further objects of the present invention will become readily apparent to one skilled in the art from the following detailed description and specific examples.

Broadly, our invention contemplates hydrocarbon conversion catalysts which are prepared from synthetic alkali metal faujasite zeolites which possess a particularly high initial (as synthesized) silica to alumina ratio.

More specifically, we have found that hydrocarbon conversion catalysts which have a high degree of thermal stability and resistance to deactivation by metals may be prepared from synthetic sodium Type Y faujasite zeolites which have a silica to alumina ratio in excess of about 5.6 and preferably greater than 5.8 (hereinafter frequently referred to as HSAY).

The HSAY used in the preparation of our catalysts may be obtained by methods which have been disclosed in the prior art. Typically, U.S. Pat. No. 3,574,538 describes a procedure wherein metakaolin and sodium silicate is reacted under hydrothermal reaction conditions in the presence of amorphous (X-ray) zeolitic nucleation centers to obtain Type Y zeolites hving a silica to alumina ratio of up to about 6. A preferred procedure for preparing HSAY may be summarized as follows:

A sodium Y type faujasite having a high silica/alumina ratio (HSAY), preferably 5.8–6.0, is obtained by lowering the active soda content in the synthesis slurry below the conventionally employed levels. This is done by adding an acid and/or an aluminum salt solution such as an aluminum sulfate solution to the sodium silicate in the zeolite synthesis slurry. Alternatively, the desired alumina and silica starting materials can be supplied in part by using an aluminum salt gelled mother liquor such as an alum gelled mother liquor. This permits the use of less reactants which are high in soda such as sodium silicate and sodium aluminate which in turn reduces the amount of soda present. The addition of these soda removers or the use of low soda reactants permits tne production of NaY having the desired high silica/alumina ratio. The final product can be ion exchanged to a low level of $Na_2O$ with rare earth or other metal cations or ammonium ions, to make a more thermally and steam stable zeolitic promoter for catalysts for treating petroleum fractions than can be made from conventional sodium Y.

In general the high silica to alumina ratio faujasites may be utilized in the manufacture of catalysts using procedures set forth in the prior art. The HSAY is ion exchanged to lower the alkali metal content and to add stabilizing, catalytically active ions. Typically, the HSAY is exchanged with solutions of polyvalent metallic ions such as rare earth calcium and magnesium ions and/or non-metallic ions such as ammonium organic substituted quarternary amorphous and hydrogen ions.

The HSAY may be ion exchanged either before or subsequent to inclusion in an inorganic oxide matrix. Furthermore, the ion exchanged HSAY may be calcined, i.e. heated at temperatures from about 200°; to 700° C. either prior to or after inclusion in a catalyst matrix. Preferably, the HSAY, when employed as a hydrocarbon cracking catalyst, will possess alkali metal content, usually expressed as soda content, $Na_2O$, of below about 6 percent by weight.

Conversion of the HSAY zeolite into usuable particulate catalyst is achieved by dispersing the finely divided HSAY zeolite into an inorganic oxide matrix. The inorganic oxide matrix may comprise or include silica-alumina, alumina, silica sols or hydrogels, in combination with additives such as clay, preferably kaolin, and other zeolites, such as ZSM type zeolites, ferrierite, clinoptilolite, mordenite, and other natural or synthetic zeolites.

The catalyst compositions may be prepared in accordance with the teachings of U.S. Pat. No. 3,957,689 which comprises combining a finely divided zeolite and clay with an aqueous slurry which is spray dried and ion exchanged to obtain a highly active hydrocarbon conversion catalyst. Furthermore, one can employ the catalyst preparation method generally shown in Canadian 967,136 which involves combining zeolite and clay with an acid alumina sol binder. When it is desired to obtain a catalyst which contains a silica alumina hydrogel binder, the processing methods of U.S. Pat. No. 3,912,611 may be utilized.

As indicated above, the HSAY zeolite is particularly resistant to hydrothermal deactivation conditions normally encountered during regeneration of cracking catalysts. Regeneration involves high temperature oxidation (burning) to remove accumulated carbon deposits at temperatures up to about 1000° C. Furthermore, it is found that the catalysts which contain the HSAY described herein are particularly resistant to the deactivation effects of contaminant metals such as nickel and vanadium which are rapidly deposited on the catalyst during the cracking of residual type hydrocarbons.

While the precise reason is not fully understood why the HSAY of the present invention and catalysts containing the HSAY described herein are particularly active and stable, it is thought that this particularly high degree of catalytic activity and stability after steam deactivation and in the presence of contaminant metals is due to its unique structure as discussed by S. Ramdas, et al in their paper "Ordering Of Aluminum And Silicon In Synthetic Faujasites", Nature, Vol. 292, July 16, 1981, pages 228–230.

During use, the catalytic cracking catalysts of the present invention are combined with a hydrocarbon feedstock which may typically comprise residual type petroleum hydrocarbon fractions that contain up to about 1,000 parts per million nickel and vanadium and up to about 10 weight percent sulfur, 2 weight percent nitrogen. The cracking reaction is normally conducted at a temperature ranging from about 200° to 600° C. using a catalyst to oil ratio on the order of 1 to 30. During the cracking reaction the catalyst typically accumulates from about 0.5 to 10 percent carbon, which is then oxidized during regeneration of the catalyst. It is found that the catalysts of the present invention are capable of sustaining degrees of activity, even after accumulating up to about 4 percent contaminating metals.

The catalysts of the present invention may be advantageously combined with additional additives or components such as platinum, which enhances the $CO/SO_x$ characteristics of the catalyst. Preferably, platinum is included in the overall catalyst composition in amounts of from about 2 to 10 parts per million. Furthermore, the catalysts may be advantageously combined with SOx gettering components such as lanthanum/alumina composites that contain on the order of about 20 percent by weight lanthanum oxide.

Having described the basic aspects of the invention, the following examples are given to illustrate specific embodiments thereof.

Example 1

A type Y zeolite having a silica to alumina ratio of 5.9:1.0 was prepared from the following three reactant solutions:

(1) 36.7 kg. of 41.0° Be sodium silicate, 12.2 kg water and 2,633 g of zeolite nucleation centers of the type described in U.S. Pat. No. 3,671,191 having the mol formula 16 $Na_2O$/15 $SiO_2/Al_2O_3$/320 $H_2O$. The materials were mixed and heated to 60° C.

(2) 1,537 g of concentrated sulfuric acid was mixed with 9,100 g water.

(3) 5,232 g of sodium aluminate solution (18.2 weight percent $Na_2O$/21.4 weight percent $Al_2O_3$) was mixed with 6,800 g of water. Tanks containing the solutions were connected to a high speed mixing pump and mixed to obtain a soft gel which was fed to a stirred reactor vessel. The reactor was closed and the gel was heated gradually to 100° C. while stirring continued. After the 100° C. temperature was reached, the stirrer was turned off and the mixture was maintained at this temperature for 70–80 hours to crystallize the HSAY. The slurry was then quenched with cold water and filtered with subsequent washings with hot water.

The material was dried and yielded 5 kg of well crystallized HSAY having a $SiO_2/Al_2O_3$ ratio 5.9±0.1. The unit cell size was 24.60 A° as determined by X-ray diffraction and the nitrogen surface area measured by the BET method was 875 $m^2/g$. The chemical analysis was 11.0 weight percent $Na_2O$, 19.6 weight percent $Al_2O_3$ and 68.4 weight percent $SiO_2$.

Example 2

HSAY zeolite was rare earth exchanged and calcined to obtain a "CREHSAY" that comprised 14.0 percent $RE_2O_3$, 2.45 percent $Na_2O$ and a silica to alumina ratio of 5.9:1.0 by the following procedure.

A 4,444 g portion of HSAY filter cake (45% solids) obtained in Example 1 was slurried in 9 l of deionized water. The HSAY slurry was then blended into a solution of 4,444 ml commercial mixed rare earth chloride solution (61% $REC1_3$ $6H_2O$ by weight) diluted with 7.5 l of deionized water. The resulting mixture was heated to 90° C.–100° C. and held at that temperature for one hour. The slurry was filtered and the filter cake was washed twice with 3 l of boiling deionized water. The washed filter cake was slurried into a solution of 4,444 ml commercial rare earth solution diluted with 16.5 liters of deionized water. The mixture was again heated to 90°–100° C. and held at temperature for one hour. Then the slurry was filtered and resulting filter cake was washed three times with 3 l of boiling deionized water. The filter cake was then oven dried at 150° C. for 4–8 hours. Finally, the dried zeolite was calcined at 538°

C. for three hours. The product CREHSAY had the following properties:

| | | |
|---|---|---|
| | $RE_2O_3$ | 14.0 wt. % Loss on Ignition (LOI) 2.1% |
| | $Na_2O$ | 2.5 wt. % |
| Ratio | $SiO_2/Al_2O_3$ | 5.9 ± 0.1 |
| Nitrogen Surface Area 768 $m^2$/gm (by BET method) | | |

Example 3

(a) The CREHSAY of Example 2 was used to prepare FCC catalyst according to the teachings of U.S. Pat. No. 3,957,689. An acid-alum-silica sol was made by mixing two solutions A and B through a high speed mixer. Solution A was 11.5 kg of 12.5% $SiO_2$ sodium silicate ($Na_2O$: 3.2 $SiO_2$). Solution B was 3.60 l of a solution made from 20 weight percent sulfuric acid (2.2 1) and dilute aluminum sulfate solution, 77 g per liter (1.4 liters). The ratio of the flows of solutions A and B through the mixer is approximately 1.5 l solution A to 0.5 l solution B. The ratio of the flows was adjusted to produce an acid-alum-silica sol having a pH of 2.9–3.2. To 14.4 kg of acid-alum-silica sol is added a slurry composed of 2,860 g kaolin clay and 2,145 g CREHSAY from Example 2 mixed into 6 l water. The mixture of the acid-alum-silica sol and the slurry of CREHASY and kaolin in water was blended and spray dried using an inlet temperature of 316° C. and an outlet temperature of 149°C. A 3,000 g portion of the spray dried product was slurried in 11.3 l of water at 60°–71° C. and filtered. The filter cake was washed three times with 3 l of 3 percent ammonium sulfate solution. Then the cake was reslurried in 9 l of hot water, filtered, and, finally, rinsed three times with 3 l of hot water. The catalyst was then oven dried at 149° C.

(b) A catalyst having the same proportions of ingredients was made in the same manner from calcined rare earth exchanged conventional NaY having a silica to alumina ratio of about 4.9±0.1.

The results of comparison tests are shown below in Table I. The microactivity test used a modification of the test procedure published by F. G. Ciapetta and D. S. Henderson entitled "Microactivity Test For Cracking Catalysts", Oil And Gas Journal, Vol. 65, pages 88–93, Oct. 16, 1967. Microactivity tests are routinely used in the petroleum industry to evaluate cracking catalysts in the laboratory. The petroleum fraction which was cracked over these catalysts was a West Texas Heavy Gas Oil (WTHGO) using the following test conditions:

Temperature 499° C.;

Weight Hourly Space Velocity (WHSV) 16;

Catalyst to oil ratio 3.

The WTHGO (1.67 g) is passed through 5.0 g of catalyst in 1.3 minutes. The products are collected and the percent conversion of gas oil into hydrogen, light gases, gasolene range hydrocarbons, etc. are determined by gas chromatography.

The catalysts were impregnated with Ni and V as naphthenates dissolved in WTHGO; next the hydrocarbons were burned off by slowly raising the temperature to 677° C. Then the metals impregnated catalysts were steam deactivated by the S-13.5 procedure before testing for cracking microactivity.

TABLE I

| | Example 3 (b) | Example 3 (a) |
|---|---|---|
| Catalyst Composition (wt. %) | | |
| Zeolite | 35 | 35 |
| $SiO_2$ | 24 | 24 |
| Clay | 41 | 41 |
| $Na_2O$ | 0.49 | 0.37 |
| $RE_2O_3$ | 4.94 | 5.08 |
| $Al_2O_3$ | 26.5 | 26.0 |
| Microactivity (Vol. % Conv.) After Indicated Deactivation | | |
| S-13.5(1) | | |
| 0% Metals | 82 | 86 |
| 1% (Ni + V)(2) | 53 | 74 |
| 1500(3) | 81 | 80 |
| 1550(4) | 20 | 64 |
| Partial Chemical Analysis of Zeolite | CREY | HSACREY |
| $SiO_2/Al_2O_3$ (Ratio) | 4.9 ± 0.1 | 5.8 ± 0.1 |
| $RE_2O_3$ (Wt. %) | 15.0 ± 1 | 14.0 ± 1 |
| $Na_2O$ (Wt. %) | 3.2 ± 0.2 | 2.4 ± 0.2 |

(1)Steam deactivation: 8 hours @ 732° C., 100% steam, 1.1 kg/$cm^2$.

(2)$Ni = \frac{V}{2}$ (3)Steam deactivation: 5 hours at 816° C., 100% steam, 0 kg/$cm^2$.

(4)Steam deactivation: 5 hours at 843° C., 100% steam, 0 kg/$cm^2$

Example 4

(a) A slurry was made from 2,576 g HSAY filter cake (45% solids) from a batch of HSAY synthesized as in Example 1 and 4,186 g of kaolin in 8.0 l of water. This slurry was thoroughly blended with 13.8 kg of acid-alum-silica sol, the preparation of which was described in Example 3. Tne mixture was spray dried using the conditions described in Example 3. The then spray dried material was washed with water and ion exchanged with mixed rare earth chloride solution as follows: A 3,000 g portion of spray dried material was slurried in 11.3 l of hot deionized water at 60°–71° C. and filtered. The filter cake was rinsed three times with 3 l of hot water. Then the cake was reslurried in 9 l of hot water and filtered again. The cake was rinsed three times with 3 l portions of hot water. The filter cake was next reslurried in 10 l of hot water and 215 ml of mixed rare earth chloride solution (60 wt. % $RECl_3$ $6H_2O$) were mixed into the slurry. The slurry was gently stirred for 20 minutes and kept at a temperature of 60°–71° C., and the pH was kept at 4.7–5.2. Lastly the slurry was filtered again and rinsed with three 3 l portions of hot water.

(b) A similar catalyst was prepared using a conventional NaY zeolite that has a $SiO_2/Al_2O_3$ ratio of about 4.9±0.1

The finished catalyst was then oven dried at 149° C. The finished catalyst made from HSAY was compared in the tests given below in Table II with the catalyst made in a similar manner from conventional NaY. West Texas Heavy Gas Oil was cracked in the microactivity test using the test conditions given in Example 3.

TABLE II

| | Example 4 (b) | Example 4 (a) |
|---|---|---|
| Catalyst Composition (wt. %) | | |
| Zeolite | 17 | 17 |
| $SiO_2$ | 23 | 23 |
| Clay | 60 | 60 |
| $Na_2O$ | 0.74 | 0.70 |
| $RE_2O_3$ | 3.68 | 3.83 |
| $SiO_2/Al_2O_3$ ratio of zeolite | 4.9 ± 0.1 | 5.8 ± 0.1 |
| Microactivity (Vol. % Conv.) | | |
| S-13.5 Deactivation | | |

TABLE II-continued

| | Example 4 (b) | Example 4 (a) |
|---|---|---|
| As Is | 73 | 82 |
| 0% Metals | 68 | 72 |
| 0.5% (Ni + V) | 28 | 54 |
| 1500 Deactivation | 48 | 62 |

Example 5

(a) A slurry was made by mixing 15.0 kg acid-alum-silica sol, 4,545 g HSAY filter cake (as in Example 4), 1,744 g kaolin, and 690 g "SRA" alumina of the type disclosed in U.S. Pat. No. 4,154,812. The slurry was spray dried using the conditions used in Example 3. A 3,000 g portion of the spray dried material was washed with hot deionized water and ion exchanged with ammonium ions as in Example 3, except that the washing and ammonium ion exchanging was done twice. The finished catalyst was dried in an oven at 149° C.

(b) A similar catalyst was made from conventional NaY for comparison.

The catalysts were steam deactivated and tested to obtain the data set forth in Table III.

TABLE III

| | Example 5 (a) | Example 5 (b) |
|---|---|---|
| Catalyst Composition (wt. %) | | |
| Zeolite | 30 | 30 |
| Alumina (SRA) | 20 | 20 |
| Clay | 25 | 25 |
| $SiO_2$ (binder) | 25 | 25 |
| $Na_2O$ | 0.97 | 0.94 |
| Silica to Alumina Ratio of Zeolite | 4.9 ± 0.1 | 5.8 ± 0.1 |
| Microactivity (Vol. % Conv.) After 1500 steam deactivation | 50.4 | 67.0 |

Example 6

(a) A slurry was prepared as shown in Example 4, except that 2,365 g of an HSAY (49% solids) filter cake from a batch of HSAY of the same properties as the batch of HSAY described in Example 1 was used, the kaolin clay amount was reduced to 3,837 g, and 411 g rare-earth containing alumina (SRD) was added to the acid-alum-silica sol. SRD alumina is a microcrystalline AlO(OH) co-precipitated with mixed rare earth oxides and contains 6.8 percent $RE_2O_3$ and 27 percent $H_2O$. The slurry was mixed well and spray dried as in Example 4. The spray dried product was washed with hot deionized water and rare earth chloride solution as in Example 4. The finished catalyst was oven dried at 149° C.

(b) A similar catalyst was prepared using conventional NaY Zeolite having a $SiO_2/Al_2O_3$ ratio of about 4.9±0.1

The dried, finished catalysts were compared and the results are shown below in Table IV.

TABLE IV

| | Example 6 (b) | Example 6 (a) |
|---|---|---|
| Catalyst Composition (wt. %) | | |
| Zeolite | 17 | 17 |
| $SiO_2$ (binder) | 23 | 23 |
| Clay | 55 | 55 |
| Alumina (SRD) | 5 | 5 |
| $Na_2O$ | 0.77 | 0.61 |
| $RE_2O_3$ | 3.66 | 2.55 |
| Microactivity (Vol. % Conv.) | | |
| S-13.5 Deactivation | | |
| As Is | 78 | 79 |
| 0% Metals | 82 | 81 |
| 0.5% (Ni + V) | 48 | 57 |
| 1500 Deactivation | 60 | 73 |

For each of the four catalysts described above the catalyst made with the HSAY type zeolite demonstrates better resistance to hydrothermal deactivation than the same formulation of catalyst made with an equal amount of conventional Y type zeolite. The three catalysts in Examples 3, 4 and 6 made with HSAY also show greater resistance to deactivation by vanadium and nickel contamination (heavy metals poisoning) then the equivalent catalysts made from conventional Y type zeolite.

The above examples clearly indicate that valuable cracking catalysts may be obtained using the teachings of the present invention.

We claim:

1. In a process for the catalytic cracking of hydrocarbons which contain high levels of metals selected from the group consisting of nickel, vanadium and mixtures thereof, the improvement comprising: reacting said hydrocarbons with a catalyst comprising;

(a) a synthetic faujasite zeolite having an initial, as synthesized, silica to alumina mol ratio in excess of about 5.6 admixed with an inorganic oxide matrix and having an alkali metal oxide content of below about 1 percent by weight; and (b) a combined nickel-vanadium content of about 0.5 to 4 percent by weight; said catalyst being further characterized by a resistance to hydrothermal deactivation as indicated by a high degree of activity for the catalytic cracking of hydrocarbons subsequent to steam treatment at elevated temperatures.

2. The process of claim 1 wherein the resistance of the catalyst to hydrothermal deactivation is characterized by a microactivity of at least about 62 volume percent conversion subsequent to steam deactivation at 1500° F.

3. The process of claim 1 wherein the resistance of the catalyst to metals deactivation is characterized by a microactivity of at least about 52 volume percent conversion subsequent to impregnation with 0.5% Ni+V and steam deactivation at 1350° F.

4. The process of claim 1 wherein the resistance of the catalyst to hydrothermal and metals deactivation is characterized by a microactivity of at least 64 volume percent conversion subsequent to steam deactivation at 1550° F., and a microactivity of at least 74 volume percent conversion subsequent to impregnation with 1% Ni+V and steam deactivation at 1350° F.

5. The process of claim 1 wherein the silica to alumina ratio of said zeolite is above about 5.8.

6. The process of claim 1 wherein said catalyst contains from about 1.0 to 90 percent by weight zeolite.

7. The process of claim 1 wherein said catalyst is exchanged with ions selected from the group consisting of hydrogen, ammonium, quaternary ammonium and polyvalent metal and mixtures thereof.

8. The process of claim 22 wherein said zeolite is exchanged prior to combination with the matrix.

9. The process of claim 1 wherein said matrix contains inorganic oxides selected from the group consisting of silica-alumina, silica, alumina, germania, gallia, alumina-rare earth hydrogels or sols, clay, and mixtures thereof.

10. The process of claim 7 wherein the catalyst has been rare earth exchanged to obtain a rare earth content up to 20 parts by weight.

11. The process of claim 10 wherein said catalyst is a fluid catalytic cracking catalyst having a particle size range of from about 10 to 300 microns.

* * * * *